(12) United States Patent
Ge et al.

(10) Patent No.: US 10,781,269 B2
(45) Date of Patent: Sep. 22, 2020

(54) NACRE-MIMETIC ENVIRONMENTALLY FRIENDLY COMPOSITE MEMBRANE WITH "INTERPENETRATING PETAL" STRUCTURE AND PREPARATION METHOD THEREOF

(71) Applicant: SOUTH CHINA UNIVERSITY OF TECHNOLOGY, Guangdong (CN)

(72) Inventors: Mingliang Ge, Guangdong (CN); Mingyi Du, Guangdong (CN); Yanwu Wang, Guangdong (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 77 days.

(21) Appl. No.: 16/315,165

(22) PCT Filed: Jun. 28, 2017

(86) PCT No.: PCT/CN2017/090428
§ 371 (c)(1),
(2) Date: Jan. 4, 2019

(87) PCT Pub. No.: WO2018/006728
PCT Pub. Date: Jan. 11, 2018

(65) Prior Publication Data
US 2019/0345264 A1    Nov. 14, 2019

(30) Foreign Application Priority Data

Jul. 4, 2016  (CN) .......................... 2016 1 0519084

(51) Int. Cl.
*C08B 15/00* (2006.01)
*C08J 5/18* (2006.01)

(52) U.S. Cl.
CPC ............... *C08B 15/005* (2013.01); *C08J 5/18* (2013.01); *C08J 2301/28* (2013.01)

(58) Field of Classification Search
CPC ......... C08J 5/18; C08J 2301/28; C08B 15/05; C08K 3/34; C08K 5/548; C08K 7/00; C08L 1/286
USPC .......................................................... 536/88
See application file for complete search history.

(56) References Cited

FOREIGN PATENT DOCUMENTS

| CN | 1400228 | 3/2003 | |
|---|---|---|---|
| CN | 101787101 | 7/2010 | |
| CN | 103073004 | 5/2013 | |
| CN | 104004556 | 8/2014 | |
| CN | 104874365 | 9/2015 | |
| CN | 104874365 A * | 9/2015 | .............. B01J 20/24 |
| CN | 106167555 | 11/2016 | |

* cited by examiner

*Primary Examiner* — Ganapathy Krishnan
(74) *Attorney, Agent, or Firm* — JCIPRNET

(57) ABSTRACT

A nacre-mimetic environmentally friendly composite membrane with an "interpenetrating petal" structure and a preparation method thereof. Materials for preparing the composite membrane include magadiite, CMC and a bis-silane coupling agent. The composite membrane according to the present invention has an "interpenetrating petal" stable structure with non-parallel petal-shaped lamellar structure. In addition, inorganic sheets intersperse with each other to form an interlock.

14 Claims, 5 Drawing Sheets

NACRE-MIMETIC ENVIRONMENTALLY FRIENDLY COMPOSITE MEMBRANE WITH "INTERPENETRATING PETAL" STRUCTURE AND PREPARATION METHOD THEREOF

CROSS-REFERENCE TO RELATED APPLICATION

This is a 371 application of the International PCT application serial no. PCT/CN2017/090428, filed on Jun. 28, 2017, which claims the priority benefits of China Application No. 201610519084.9, filed on Jul. 4, 2016. The entirety of each of the above-mentioned patent applications is hereby incorporated by reference herein and made a part of this specification.

TECHNICAL FIELD

The present invention relates to the technical field of biomimetic materials, and in particular, relates to a nacre-mimetic environmentally friendly composite membrane with "interpenetrating petal" structure and a preparation method thereof.

BACKGROUND

The unique microstructure of natural shells has become a model structure for the preparation of lightweight, high-strength and super-toughness layered composite materials. Therefore, many researchers are inspired by the relationship between their "brick-mud" structure and excellent mechanical properties, and use a nano-sized or micron-sized functional inorganic sheet material with a two-dimensional structure as the "brick", and use an organic polymer as the "mud" to prepare a nacre-mimetic layered micro-nano composite material with the "brick-mud" structure. The nacre-mimetic material exhibits ductile fracture. When the load reaches a specific strength, the inorganic laminates may be subjected to slip and pull-out before shear yield of the polymer. However, the parallel arrangement structure of the laminates causes the slip easier, which results in a degradation of the mechanical strength. Therefore, the mechanical properties of the nacre-mimetic material may be controlled by slips between the micro-nano laminates and the polymer and a mutual effect therebetween.

At present, in the study of the nacre-mimetic materials, inorganic sheet materials mainly include layered silicate, layered double hydroxide (LDH), graphene oxide, hydroxyapatite, zirconium phosphate, aluminum oxide and the like. Among them, the layered silicate represented by montmorillonite is widely used as an inorganic sheet material in the nacre-mimetic membrane because of its wide source, low price and environmental friendliness. However, the montmorillonite has poor compatibility with polymers. Although studies have been conducted to intercalate and modify the montmorillonite to improve lipophilicity and enlarge the interlayer spacing, combination of the organophilic montmorillonite and the polymer is still enabled by a weak Van der Waals force. In addition, since the montmorillonite nearly has no functional group for modification on the surface of the sheets thereof, the functional modification of the montmorillonite is restricted. Compared with the montmorillonite, the present invention uses synthesized magadiite. The synthesized magadiite has the following advantages: First, high-purity magadiite may be obtained by controlling the synthesis process. Second, the magadiite has many silanol groups (Si—OH) on inner and outer surfaces thereof, and the laminate zone has abundant negative charges, and thus has a strong electrostatic effect in case of combination to the polymer. Third, the laminate has an excellent expansion property, a cation exchange amount between the layers is far greater than that of the montmorillonite, and polymer molecules may better intercalate in between the sheets of the magadiite, thereby forming a "hard-soft" alternated layered structure. Fourth, individual sheets of the magadiite have a large thickness, and thus the magadiite has good stability, such that a nacre-mimetic environmentally friendly composite material with good and stable structural properties may be obtained when being reacted with the polymer. Fifth, the laminate of the magadiite is only formed by silicon-oxygen tetrahedrons ($SiO_4$), and no aluminum or other metal cations that are easily hydrolyzed are contained except the sodium ions; therefore, good acid resistance, thermal stability and biocompatibility are achieved. Sixth, the magadiite has a low price and thus is advantageously competitive in the market, and has a wide application prospect in the preparation of the nacre-mimetic environmentally friendly composite material.

In the current relevant research literatures on the nacre-mimetic materials at home and abroad, what the chosen inorganic sheet material and the polymer are compounded and hybridized to form is a parallelly arranged "brick-mud" structure. Such parallel structure achieves positive effects on gas barrier and permeation resistance and the like of the nacre-mimetic composite membrane. However, in case of tension by an external force, the inorganic sheets are easily subjected to slip and pull-out before shear yielding of the polymer, such that an adverse impact is caused to the mechanical properties of the nacre-mimetic composite material. On the contrary, according to the present invention, magadiite with a rose petal layered structure is coupled with CMC (carboxymethyl cellulose), with a bis-silane coupling agent, and a nacre-mimetic membrane with an interlaced "interpenetrating petal" structure is prepared. This unique structure more effectively improves the properties of the material. At present, there is no relevant study literature and report at home and abroad regarding this structure. Therefore, the present invention is of significant innovation.

SUMMARY

Aiming at the drawbacks in the currently prepared nacre-mimetic environmentally friendly composite materials, an objective of the present invention is to provide a nacre-mimetic environmentally friendly composite membrane and a preparation method thereof. The composite membrane has an "interpenetrating petal" structure. The nacre-mimetic environmentally friendly composite membrane includes: magadiite as a hard phase for achieving the effects of reinforcement and barrier; CMC as a soft phase for achieving the effects of compliance, enhanced toughness, enhanced compatibilization, lipophilicity and the like; and a bis-silane coupling agent which achieves an effect of a bridge and enhances mutual effects between interfaces of hard and soft phases. The "interpenetrating petal" structure of the nacre-mimetic environmentally friendly composite membrane is capable of exerting a "mortise-and-tenon" effect, making it more difficult for the sheets to slip around each other, and meanwhile is capable of changing a transmission direction of the load. In this way, internal stress distribution of a polymer matrix is more balanced, and mechanical properties of the nacre-mimetic membrane are effectively enhanced. In addition, the composite membrane has characteristics of good flexibility, high transparency, excellent flame retardance, simple and convenient preparation method, and easy industrial processing. Therefore, the composite membrane has good application prospects in various fields such as flame retarding, food packaging, water treatment, gas proofing, biosensor, capacitor, and environmental protection.

The objective of the present invention is implemented at least via one of the following technical solutions.

A preparation method for a nacre-mimetic environmentally friendly composite membrane with an "interpenetrating petal" structure is provided. In the preparation method, materials for preparing the composite membrane include magadiite, carboxymethyl cellulose (CMC) and a bis-silane coupling agent.

Further, the preparation method includes the following steps:

(1) dispersing the magadiite (prepared according to the invention "PREPARATION METHOD FOR TWO-DIMENSIONAL LAYERED MATERIAL MAGADIITE", with the publication number CN103073004A) into water, and carrying out mechanical agitation and ultrasonic dispersion to obtain a uniform magadiite dispersion;

(2) dissolving the CMC into water, and carrying out mechanical agitation for full dissolution to obtain a CMC solution;

(3) slowly adding the CMC solution into the uniform magadiite dispersion, carrying out mechanical agitation for sufficient intercalation reaction, slowly dropwise adding a resulted mixture into the bis-silane coupling agent, and continuously carrying out the mechanical agitation and carrying the ultrasonic dispersion to obtain a precursor solution; and (4) slowly and uniformly pouring the precursor solution into a culture dish, drying the precursor solution at a constant temperature in a vacuum oven by the evaporation self-sedimentation method, and forming a layer of transparent thin film at the bottom of the culture dish, wherein the formed transparent thin film is the nacre-mimetic environmentally friendly composite membrane with the "interpenetrating petal" structure.

Further, sheets of the composite membrane have a structure therebetween as follows:

Further, the magadiite is prepared from cheap white carbon, sodium hydroxide, sodium carbonate, water and the like starting materials.

Further, the bis-silane coupling agent is bis-[trioxysilyl]propyl-tetrasulfide or bis-[trioxysilyl]propyl-disulfide.

Further, a weight ratio of the magadiite to the CMC is 2:8 to 8:2.

Further, an amount of the bis-silane coupling agent accounts for 10% to 50% of the weight of the magadiite.

Further, the mechanical agitation and the ultrasonic dispersion last for 30 to 120 minutes and 10 to 30 minutes respectively.

Further, the mechanical agitation and the drying are carried out at a temperature of 10° C. to 60° C. and a temperature of 40° C. to 80° C. respectively.

A nacre-mimetic environmentally friendly composite membrane with an "interpenetrating petal" structure prepared by using the preparation method as described above is provided.

Compared with the prior art, the present invention has the following advantages:

1. Compared with weak ion absorption force between the polymer and the inorganic sheets in a conventional nacre-mimetic membrane, in the nacre-mimetic membrane with the "interpenetrating petal" structure according to the present invention, the bis-silane coupling agent causes a coupling reaction between the polymer and the hydroxyl groups in the magadiite, such that a strong covalent bond is formed, and a nacre-mimetic material with a stable structure is prepared. Particularly, the magadiite, as a hard phase, achieves the effects of reinforcement and barrier; the CMC, as a soft phase, achieves the effects of compliance, enhanced toughness, enhanced compatibilization, lipophilicity and the like; and the bis-silane coupling agent which achieves an effect of a bridge and a link, and enhances mutual effects between interfaces of hard and soft phases such that a nacre-mimetic environmentally friendly membrane with the "interpenetrating petal" structure is formed. In addition, the preparation process is simple, convenient and easy for industrial processing.

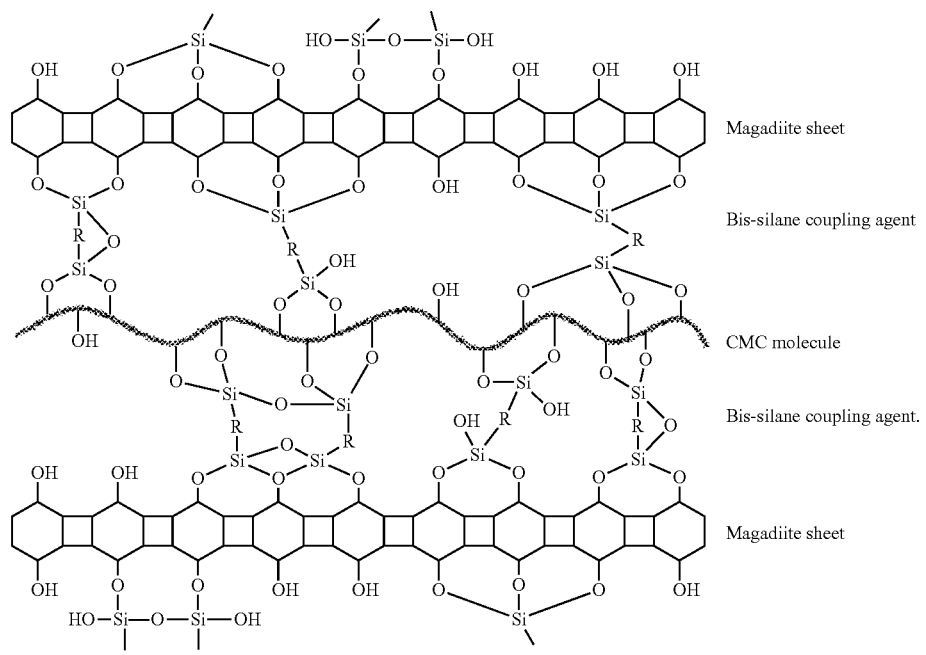

2. Compared with a conventional nacre-mimetic membrane with a "brick-mud" structure, in the composite membrane with the ""interpenetrating petal" structure according to the present invention, a non-parallel petal-shaped lamellar structure of the magadiite is capable of changing the transmission direction of a force under a tension effect by an external force, such that force distribution inside a polymer matrix is more balanced. In addition, a "mortise-and-tenon" effect is resulted between the inorganic sheets, and an interlaminar interaction force forms interlocks, making it difficult for the sheets to slip around each other, thereby effectively enhancing tough pull-out strength of the inorganic sheets.

3. The nacre-mimetic environmentally friendly composite membrane with the "interpenetrating petal" structure according to the present invention has characteristics of good flexibility, high transparency and excellent flame retardance. Therefore, the composite membrane has good application prospects in various fields such as flame retarding, food packaging, water treatment, gas proofing, biosensor, capacitor, and environmental protection.

4. The inorganic material magadiite according to the present invention has a low price, and has many silanol groups (Si—OH) on inner and outer surfaces thereof. In addition, the laminate zone has abundant negative charges, and thus has a strong electrostatic effect. The laminate has an excellent expansion property. Relative to the montmorillonite, the polymer molecules may better intercalate in between the sheets of the magadiite, thereby forming a "hard-soft" alternated stable layered structure. Further, the laminate of the magadiite is only formed by silicon-oxygen tetrahedrons ($SiO_4$), and no aluminum or other metal cations that are easily hydrolyzed are contained except the sodium ions. Therefore, the magadiite is innovative in use as a bio-environmentally friendly material.

DETAILED DESCRIPTION

The present invention is further described hereinafter with reference to the accompanying drawings and exemplary embodiments.

Embodiment 1

Figure 1:
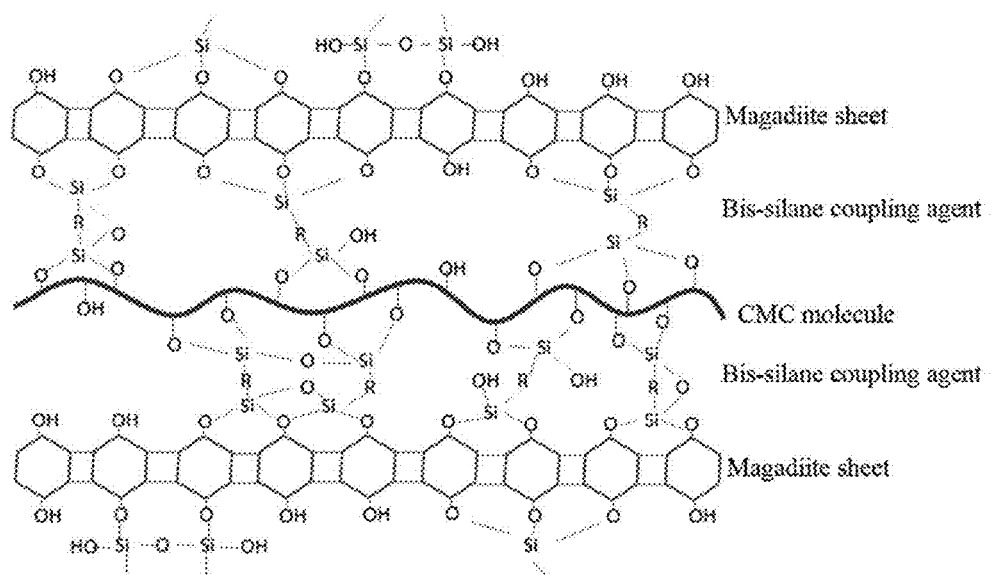
FIG. 1 is a schematic structural diagram of sheets of a nacre-mimetic environmentally friendly composite membrane with an "interpenetrating petal" structure.
Figure 2:
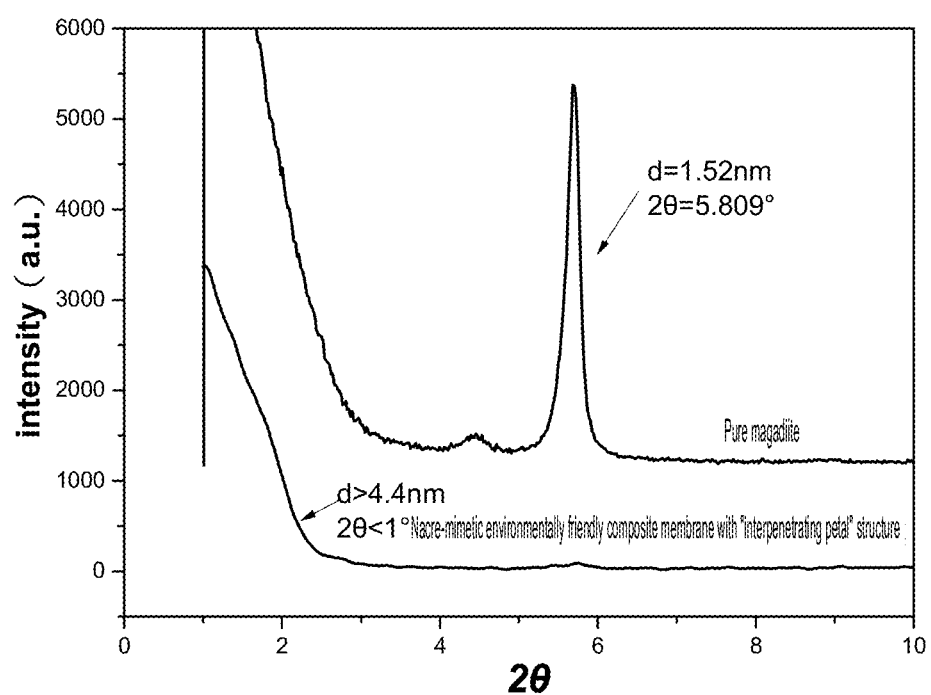
FIG. 2 is an XRD pattern of a pure magadiite and the nacre-mimetic environmentally friendly composite membrane with the "interpenetrating petal" structure, wherein the ordinate indicates an intensity.

In this embodiment, a nacre-mimetic environmentally friendly composite membrane with an "interpenetrating petal" structure is prepared by the following steps:

4 g of magadiite was dispersed into water, mechanical agitation was carried out at 10° C. for 30 minutes and then ultrasonic dispersion was carried out for 10 minutes to obtain a uniform magadiite dispersion; meanwhile 1 g of CMC was dissolved into water, mechanical agitation was carried out at 30° C. for 30 minutes for full dissolution to obtain a CMC solution; then the CMC solution was added into the uniform magadiite dispersion, mechanical agitation was carried out at 60° C. for 120 minutes for sufficient intercalation reaction, a resulted mixture was dropwise added into 1.5 g of Si-69 bis-[trioxysilyl]propyl-tetrasulfide, the mechanical agitation was carried out at 60° C. for 120 minutes and then ultrasonic dispersion was carried out for 30 minutes to obtain a precursor solution; and the precursor solution was uniformly poured into a culture dish, the precursor solution was dried at a constant temperature of 60° C. in a vacuum oven by the evaporation self-sedimentation method, a layer of transparent thin film was formed at the bottom of the culture dish, wherein the formed transparent thin film was the nacre-mimetic environmentally friendly composite membrane with the "interpenetrating petal" structure. FIG. 1 illustrates a schematic structural diagram of sheets of the nacre-mimetic environmentally friendly composite membrane with the "interpenetrating petal" structure. The mechanical agitation and the ultrasonic dispersion are intended to better cause the CMC molecules to intercalate the sheets of the magadiite, and to induce a coupling reaction of the CMC molecules and the sheets with the bis-silane coupling agent, thus increasing a layer spacing of the magadiite. As seen from FIG. 2, a diffraction peak is present at 5.809° in an XRD pattern of the pure magadiite, which indicates that the layer spacing is 1.52 nm; whereas no diffraction peak of the composite membrane is present within the measurement range, which indicates that the spacing between the sheets of the magadiite in the composite membrane apparently increased and is over 4.4 nm.

Embodiment 2

Figure 3:
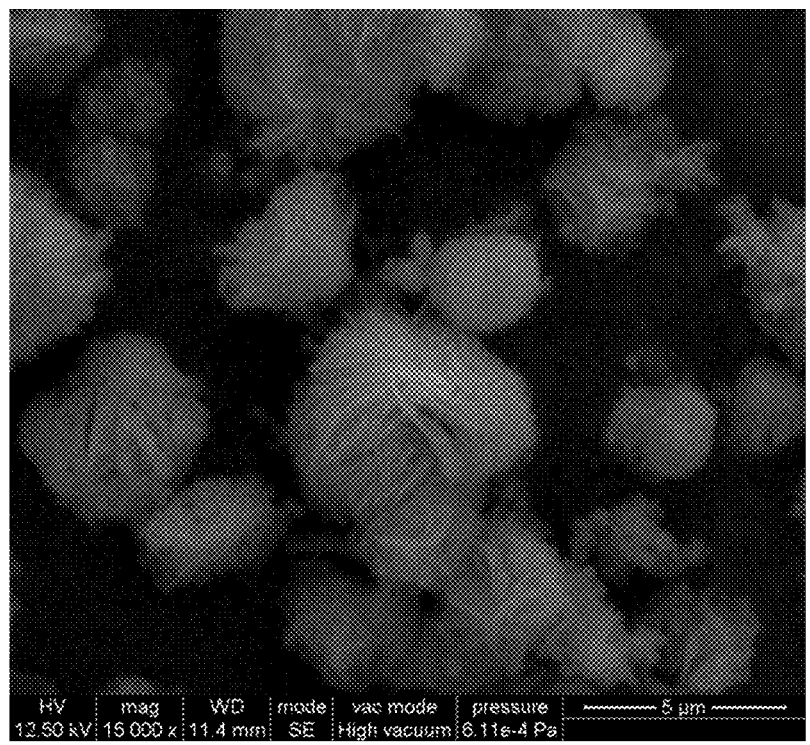
FIG. 3 is an SEM image of the pure magadiite.
Figure 4A:
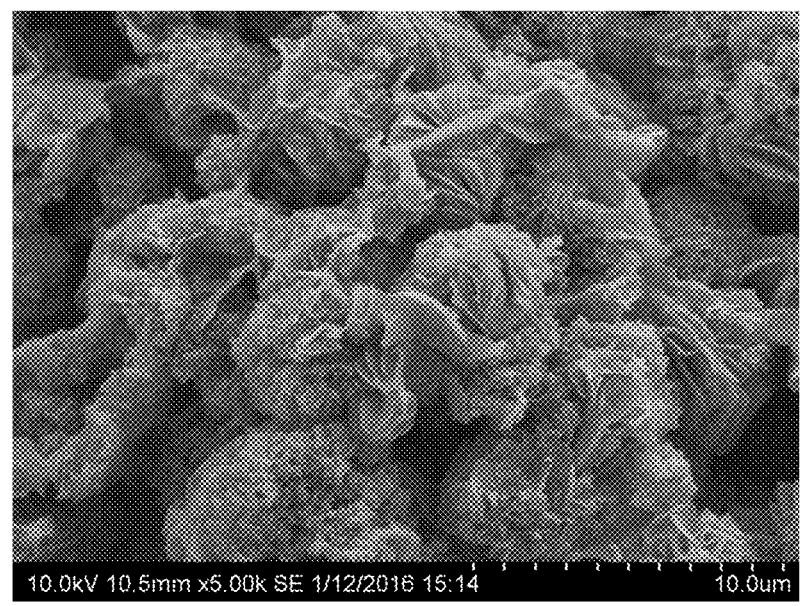
FIG. 4a and FIG. 4b are SEM images of the nacre-mimetic environmentally friendly composite membrane with the "interpenetrating petal" structure.
Figure 4B:
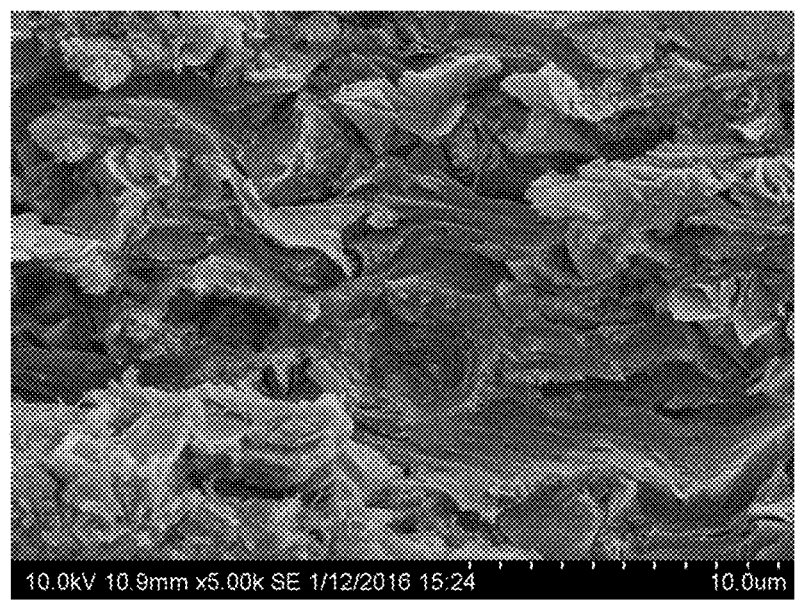

1 g of magadiite was dispersed into water, mechanical agitation was carried out at 30° C. for 80 minutes and then ultrasonic dispersion was carried out for 20 minutes to obtain a uniform magadiite dispersion; meanwhile 4 g of CMC was dissolved into water, mechanical agitation was carried out at 50° C. for 80 minutes for full dissolution to obtain a CMC solution; then the CMC solution was added into the uniform magadiite dispersion, mechanical agitation was carried out at 50° C. for 120 minutes for sufficient intercalation reaction, a resulted mixture was dropwise added into 2.5 g of A-1589 bis-[trioxysilyl]propyl-disulfide, the mechanical agitation continuously carried out at 40° C. for 60 minutes and then the ultrasonic dispersion was carried for 30 minutes to obtain a precursor solution; and the precursor solution was uniformly poured into a culture dish, the precursor solution was dried at a constant temperature of 40° C. in a vacuum oven by the evaporation self-sedimentation method, a layer of transparent thin film was formed at the bottom of the culture dish, wherein the formed transparent thin film was the nacre-mimetic environmentally friendly composite membrane with the "interpenetrating petal" structure. FIG. 3 illustrates an SEM image of the pure magadiite, and FIG. 4a and FIG. 4b illustrate SEM images of the nacre-mimetic environmentally friendly composite membrane with the "interpenetrating petal" structure. As seen from the figures, the composite membrane has a very uniform and unified biomimetic "interpenetrating petal" layered structure.

Embodiment 3

2 g of magadiite was dispersed into water, mechanical agitation was carried out at 60° C. for 120 minutes and then ultrasonic dispersion was carried out for 30 minutes to obtain a uniform magadiite dispersion; meanwhile 2 g of CMC was dissolved into water, mechanical agitation was carried out at 10° C. for 120 minutes for full dissolution to obtain a CMC solution; then the CMC solution was added into the uniform magadiite dispersion, mechanical agitation was carried out at 30° C. for 60 minutes for sufficient intercalation reaction, a resulted mixture was dropwise added into 0.5 g of Si-69 bis-[trioxysilyl]propyl-tetrasulfide, the mechanical agitation was carried out at 30° C. for 80 minutes and the ultrasonic dispersion was carried out for 20 minutes to obtain a precursor solution; and the precursor solution was uniformly poured into a culture dish, the precursor solution was dried at a constant temperature of 80° C. in a vacuum oven by the evaporation self-sedimentation method, a layer of transparent thin film was formed at the bottom of the culture dish, wherein the formed transparent thin film was the nacre-mimetic environmentally friendly composite membrane with the "interpenetrating petal" structure. The prepared composite membrane has a smooth surface and good transparency. After a piece of the nacre-mimetic environmentally friendly composite membrane with the "interpenetrating petal" structure was combusted with an alcohol lamp, a complete structure was still maintained in the flames of the alcohol lamp, with no scatters falling off and no dense smoke or oil drop. The membrane has good flame-retardance.

Obviously, the above embodiment is merely an exemplary one for illustrating the present invention, but is not intended to limit the implementation of the present invention. Persons of ordinary skills in the art may derive other modifications and variations based on the above embodiments. All embodiments of the present invention are not exhaustively listed herein. Any modification, equivalent replacement, or improvement made without departing from the spirit and principle of the present invention should fall within the protection scope of the present invention.

What is claimed is:

1. A preparation method for a nacre-mimetic environmentally friendly composite membrane with an "interpenetrating petal" structure, wherein in the preparation method, materials for preparing the composite membrane comprise magadiite, carboxymethyl cellulose (CMC) and a bis-silane coupling agent, and the method comprises the following steps:
   (1) dispersing the magadiite in water, and carrying out mechanical agitation and ultrasonic dispersion to obtain a uniform magadiite dispersion;
   (2) dissolving the CMC in water, and carrying out mechanical agitation for full dissolution to obtain a CMC solution;
   (3) adding the CMC solution into the uniform magadiite dispersion, carrying out mechanical agitation for sufficient intercalation reaction, dropwise adding the resulting mixture into the bis-silane coupling agent, and continuously carrying out the mechanical agitation and carrying out the ultrasonic dispersion to obtain a precursor solution; and
   (4) uniformly pouring the precursor solution into a culture dish, drying the precursor solution at a constant temperature in a vacuum oven by the evaporation self-sedimentation method, and forming a layer of transparent thin film at the bottom of the culture dish, wherein the formed transparent thin film is the nacre-mimetic environmentally friendly composite membrane with the "interpenetrating petal" structure.

2. The preparation method for the nacre-mimetic environmentally friendly composite membrane with the "interpenetrating petal" structure according to claim 1, wherein a composite membrane structure obtained in the preparation method is the "interpenetrating petal" structure, and sheets of the composite membrane have a structure therebetween as follows:

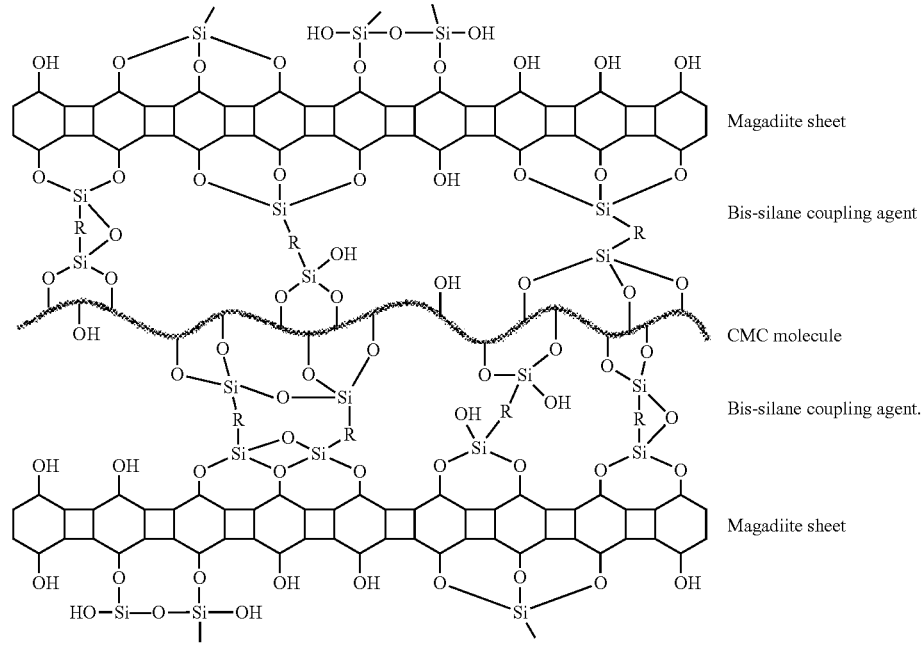

3. The preparation method for the nacre-mimetic environmentally friendly composite membrane with the "interpenetrating petal" structure according to claim 1, wherein the bis-silane coupling agent is bis-[trioxysilyl]propyl-tetrasulfide or bis-[trioxysilyl]propyl-disulfide.

4. The preparation method for the nacre-mimetic environmentally friendly composite membrane with the "interpenetrating petal" structure according to claim 1, wherein a weight ratio of the magadiite to the CMC is 2:8 to 8:2.

5. The preparation method for the nacre-mimetic environmentally friendly composite membrane with the "interpenetrating petal" structure according to claim 1, wherein an amount of the bis-silane coupling agent accounts for 10% to 50% of the weight of the magadiite.

6. The preparation method for the nacre-mimetic environmentally friendly composite membrane with the "interpenetrating petal" structure according to claim 1, wherein the mechanical agitation and the ultrasonic dispersion last for 30 to 120 minutes and 10 to 30 minutes respectively.

7. The preparation method for the nacre-mimetic environmentally friendly composite membrane with the "interpenetrating petal" structure according to claim 1, wherein the mechanical agitation and the drying are carried out at a temperature of 10° C. to 60° C. and a temperature of 40° C. to 80° C. respectively.

8. A nacre-mimetic environmentally friendly composite membrane with the "interpenetrating petal" structure prepared by using the preparation method according to claim 1.

9. A nacre-mimetic environmentally friendly composite membrane with the "interpenetrating petal" structure prepared by using the preparation method according to claim 2.

10. A nacre-mimetic environmentally friendly composite membrane with the "interpenetrating petal" structure prepared by using the preparation method according to claim 3.

11. A nacre-mimetic environmentally friendly composite membrane with the "interpenetrating petal" structure prepared by using the preparation method according to claim 4.

12. A nacre-mimetic environmentally friendly composite membrane with the "interpenetrating petal" structure prepared by using the preparation method according to claim 5.

13. A nacre-mimetic environmentally friendly composite membrane with the "interpenetrating petal" structure prepared by using the preparation method according to claim 6.

14. A nacre-mimetic environmentally friendly composite membrane with the "interpenetrating petal" structure prepared by using the preparation method according to claim 7.

* * * * *